United States Patent
Garcia-Saavedra et al.

(10) Patent No.: US 10,979,319 B2
(45) Date of Patent: Apr. 13, 2021

(54) METHOD FOR PROVIDING OPERATING INFORMATION FOR A NETWORK

(71) Applicant: NEC Laboratories Europe GmbH, Heidelberg (DE)

(72) Inventors: Andres Garcia-Saavedra, Heidelberg (DE); Xi Li, Heidelberg (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 237 days.

(21) Appl. No.: 16/085,602

(22) PCT Filed: Apr. 4, 2016

(86) PCT No.: PCT/EP2016/057357
§ 371 (c)(1),
(2) Date: Sep. 17, 2018

(87) PCT Pub. No.: WO2017/174111
PCT Pub. Date: Oct. 12, 2017

(65) Prior Publication Data
US 2019/0104031 A1 Apr. 4, 2019

(51) Int. Cl.
*G06F 15/16* (2006.01)
*H04L 12/24* (2006.01)
(Continued)

(52) U.S. Cl.
CPC ...... *H04L 41/5041* (2013.01); *H04L 41/0896* (2013.01); *H04L 41/12* (2013.01);
(Continued)

(58) Field of Classification Search
CPC . H04L 41/5041; H04L 41/0896; H04L 41/12; H04L 41/14; H04L 45/02
See application file for complete search history.

(56) References Cited

U.S. PATENT DOCUMENTS

| | | | | |
|---|---|---|---|---|
| 8,761,786 | B2* | 6/2014 | Monnes | H04W 28/08 455/452.1 |
| 10,123,205 | B2* | 11/2018 | Senarath | H04W 12/06 |

(Continued)

FOREIGN PATENT DOCUMENTS

WO WO 2015169370 A1 11/2015

*Primary Examiner* — Douglas B Blair
(74) *Attorney, Agent, or Firm* — Leydig, Voit & Mayer, Ltd.

(57) ABSTRACT

A method provides operating information for a network having a set of computing entities (CPE) for performing functions on data; a set of connecting entities (CNE) for connecting users and performing functions on data; and a set of forwarding entities (SFE) for forwarding data between the CPE and CNE. CNE are assigned to the CPE. At least part of the functions performed by the CNE are split and off-loaded to the assigned CPE for performing the part of functions. The method includes: determining: a) network information, including network topology information and network capability information of the network, b) entity location information, including network locations of the entities, and c) function splitting information, including possible configurable functions which can be split; and, based on the determined information of a)-c), jointly optimizing: routing between the network entities, assignments of the CNE to the CPE, and function splits.

17 Claims, 8 Drawing Sheets

(51) Int. Cl.
*H04L 29/08* (2006.01)
*H04L 12/751* (2013.01)
*H04L 12/721* (2013.01)
*H04W 16/18* (2009.01)
*H04W 28/16* (2009.01)

(52) U.S. Cl.
CPC ............. *H04L 41/14* (2013.01); *H04L 45/02* (2013.01); *H04L 45/44* (2013.01); *H04L 67/1002* (2013.01); *H04W 16/18* (2013.01); *H04W 28/16* (2013.01)

(56) References Cited

U.S. PATENT DOCUMENTS

| | | |
|---|---|---|
| 2003/0007515 A1* | 1/2003 | Apostolopoulos ........................... H04N 21/4622 370/503 |
| 2003/0009576 A1* | 1/2003 | Apostolopoulos .... H04W 36/18 709/231 |
| 2003/0009577 A1* | 1/2003 | Apostolopoulos ...... H04L 67/14 709/231 |
| 2003/0009589 A1* | 1/2003 | Apostolopoulos ........................... H04N 21/23103 709/239 |
| 2008/0151748 A1 | 6/2008 | Virgilio et al. |
| 2011/0078679 A1* | 3/2011 | Bozek ................... G06F 9/5044 718/1 |
| 2013/0227113 A1* | 8/2013 | Baras ................. H04L 41/0893 709/224 |
| 2014/0029431 A1 | 1/2014 | Haberland et al. |
| 2014/0038654 A1* | 2/2014 | Ahmadi ................ G06F 9/5027 455/509 |
| 2014/0328204 A1 | 11/2014 | Klotsche et al. |
| 2015/0382275 A1 | 12/2015 | Pragada et al. |
| 2016/0103695 A1* | 4/2016 | Udupi .................... H04L 47/78 718/1 |
| 2017/0147413 A1* | 5/2017 | Grebnov ................ G06F 9/528 |
| 2017/0353903 A1* | 12/2017 | Rost ...................... H04W 88/04 |

* cited by examiner

```
 1: function GREEDY_OPT(B, R, V, Q)
 2:    /*Initialisation*/
 3:    for ∀q ∈ Q, ∀m ∈ B do
 4:       θ_q = ∅
 5:    end for
 6:    c_ub = ∞
 7:    /*Big loop*/
 8:    (P, c_ub) = find_routes(B, R, V, Q, θ, c_ub)
 9:    while |P| = |U| do
10:       /*All flows could be routed*/
11:       (P*, c*_ub) = (P, c_ub)
12:       for ∀q ∈ Q, |θ_q| < |F| do
13:          α_q = Σ_{n∈q} max{F_{X_n, θ_{q'} = {θ_q, f_{|θ_q|+1}}}}
14:       end for
15:       if α = ∅ then
16:          return (P*, c*_ub)
17:       end if
18:       q* = argmax(α)
19:       θ_{q*} = {θ_{q*}, f_{|θ_{q*}|+1}}
20:       (P, c_ub) = find_routes(B, R, V, Q, θ, c_ub)
21:    end while
22:    return (P*, c*_ub)
23: end function
```

Fig. 7

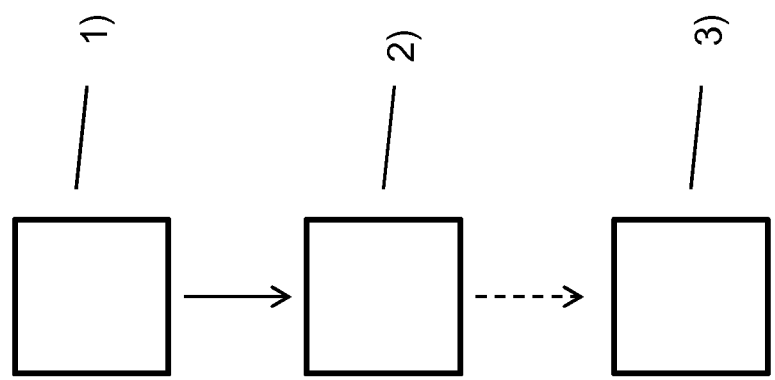

METHOD FOR PROVIDING OPERATING INFORMATION FOR A NETWORK

STATEMENT ON GOVERNMENT SUPPORT

The work leading to this invention has received funding from the European Union's Horizon 2020 Programme under grant agreement No. 671598.

CROSS REFERENCE TO PRIOR APPLICATION

This application is a U.S. National Stage Application under 35 U.S.C. § 371 of International Application No. PCT/EP2016/057357 filed on Apr. 4, 2016. The International Application was published in English on Oct. 12, 2017 as WO 2017/174111 A1 under PCT Article 21(2).

FIELD

The present invention relates to providing operating information for a network including a set of computing entities.

BACKGROUND

Although applicable in general to any kind of access network the present invention will be described with regard to radio access networks (RAN).

The increasing demand for mobile data and valued-added services, e.g. mobile broadband service, has caused exponential growth of data traffic in mobile networks. The mobile network operators are facing the challenge to greatly increase the capacity and coverage of their networks to meet the exponential traffic growth. To support this challenge and to achieve the required 5G data rates, extensive support for novel air interface technologies such as Cooperative Multi-point (CoMP), Carrier Aggregation (CA), and massive MIMO will be needed. One of the major challenges of deploying such technologies is the need for centralization, i.e. joint processing of traffic from multiple base stations at a common centralized entity and tight coordination among different radio sites. To address this problem, the architecture of Cloud Radio Access Network or Centralized-RAN, 'C-RAN', has been introduced some years ago as a key enabler of such novel technologies. An additional advantage of centralizing BS functionality is the reduced operational costs in comparison to traditional BS architectures, e.g. simpler maintenance, more efficient energy utilization, etc.

Unlike conventional RAN where the elements processing the base band signal called Base Band Units, BBU, and the radio elements, called Remote Radio Head, RRH, are situated together at the base station, in C-RAN the BBUs are centralized in a single location or even virtualized into a cloud-computing platform allowing for centralized operation of BBUs as disclosed in the non-patent literature of M. Peng, C. Wang, V. Lau, and H. Poor, "Fronthaul-constrained cloud radio access networks: insights and challenges," Wireless Communications, IEEE, vol. 22, no. 2, pp. 152-160, April 2015. The BBUs are connected to the core network through the conventional packet-based switching network, namely the backhaul, 'BH'. The challenge of C-RAN deployment is that the separation of BBU and RRH requires these two elements to be connected through a high-speed, low-latency and accurately synchronized network, the so-called fronthaul, 'FH', to transport the digitized radio signals. Two conventional protocols for the transport of fronthaul traffic are e.g. CPRI (Common Public Radio Interface) or OBSAI (Open Base Station Architecture Initiative), which have most stringent bandwidth, delay, jitter, and synchronization requirements. Such critical requirements can currently only be supported by costly fibre optical networks, i.e. with point-to-point optical links.

The conventional fronthaul interface relying on fiber optics has the following limitations as shown in the non-patent literature of C.-L. I, Y. Yuan, J. Huang, S. Ma, C. Cui, and R. Duan, "Rethink fronthaul for soft RAN," Communications Magazine, IEEE, vol. 53, no. 9, pp. 82-88, September 2015 or "White Paper of Next Generation Fronthaul Interface," White paper, China Mobile Research Institute, Alcatel-Lucent, Nokia Networks, ZTE Corporation, Broadcom Corporation, Intel China Research Center, June 2015:

The bandwidth usage is constant and independent of user traffic, which is highly inefficient;

Only point-to-point connections are allowed, which results in low path diversity;

The split of base station function between RRH and BBU is fixed and static;

Fronthaul is a separate network segment, completely incompatible to the backhaul in terms of physical interfaces, data, control, and management plane.

Further the fronthaul segment may be transformed into a low-cost packet-based network. This will enable a more flexible statistical multiplexing of the networking resources, and higher path diversity between RRHs and BBUs that increases flexibility and reliability. In summary, the so-called 5G transport segment between radio sites and mobile core will become a packet-based network with no clear distinction between fronthaul and backhaul, finally converging into an integrated BH/FH transport network which is called crosshaul (XH) in the following.

As described above, conventional C-RAN offloads most of the functionality of conventional base stations to a centralized computing platform which has a very high demand of networking resources. A way to alleviate the costs of conventional FH without sacrificing much of the benefits that centralization brings is to provide a finer control on the amount of Base Station (BS) functionality that is offloaded (and thus on the traffic demands): Flexible functional splits can be used where the BS functionality is modularized into different functions that can be flexibly centralized or distributed depending on the crosshaul resources as disclosed in the non-patent literature of D. Wubben, P. Rost, J. Bartell, M. Lalam, V. Savin, M. Gorgoglione, A. Dekorsy, and G. Fettweis, "Benefits and impact of cloud computing on 5G signal processing: Flexible centralization through cloud-RAN," Signal Processing Magazine, IEEE, vol. 31, no. 6, pp. 35-44, November 2014 and P. Rost et al., "Cloud technologies for flexible 5G radio access networks," in IEEE Communications Magazine, vol. 52, no. 5, pp. 68-76, May 2014. Offloading BS functionality into a centralized location (Centralized Computing Pool, CCP, hereafter) may have lower operational costs (e.g. common refrigeration, single-point maintenance, etc.) and capacity gains to users (joint signal processing, coordinated resource allocation, etc.). However, the delay and throughput requirements for the transport network are more stringent the larger the number of functions which are offloaded shown in Table 1 below:

TABLE 1

| Split | Functions in RRH | Functions in CCP | Base Bandwidth (per cell) | Max. latency |
|---|---|---|---|---|
| A | RF | PHY, MAC, RRM, Adm./Cong. Control, Network mgmt. | 2.5 Gbps | 5 μs |

TABLE 1-continued

| Split | Functions in RRH | Functions in CCP | Base Bandwidth (per cell) | Max. latency |
|---|---|---|---|---|
| B | RF, PHY | MAC, RRM, Adm./Cong. Control, Network mgmt. | 470 Mbps | ~1 ms |
| C | RF, PHY, MAC | RRM, Adm./Cong. Control, Network mgmt. | 100 Mbps | ~3 ms |
| D | RF, PHY, MAC, RRM | Adm./Cong. Control, Network mgmt. | 70 Mbps | ~3 ms |
| E | RF, PHY, MAC, RRM, Adm./Cong. Control | Network mgmt. | 70 Mbps | ~100 ms |

Despite the decomposition of the BS functionality into functions that can be flexibly distributed across an integrated BH/FH packet-based network (i.e. XH), an optimized management of the transport resources is inherently challenging. Conventional methods to route flows in a backhaul network are e.g. described in U.S. patent application Ser. No. 14/358,131 and U.S. patent application Ser. No. 14/766,370. Moreover, routing in the fronthaul and backhaul segments is handled separately, in a different process, in conventional systems. These routing methods are not able to efficiently handle the optimization of the RAN functional placement (i.e. optimizing the degree of centralization).

In ICT iJOIN FP7 Project, "Final definition and evaluation of network-layer algorithms and network operation and management", Deliverable 4.3 (Ch. 4.3, 4.4 and 6.3) and Suryaprakash, Vinay, Peter Rost, and Gerhard Fettweis. "Are Heterogeneous Cloud-Based Radio Access Networks Cost Effective?" Selected Areas in Communications, IEEE Journal on 33.10 (2015): 2239-2251, the focus is set to optimizing the location of the data centers or computing pools (CCPs) given a certain functional split option.

In the non patent literature of P. Rost et al., "Cloud technologies for flexible 5G radio access networks," in IEEE Communications Magazine, vol. 52, no. 5, pp. 68-76, May 2014 it is shown that flexible centralization as implementing through functional splits implies a need for transport routing schemes capable of deliver data towards computing pools independently of the degree of centralization.

SUMMARY

An embodiment of the present invention provides a method that provides operating information for a network. The network includes: a set of computing entities (CPE) for performing functions on data; a set of connecting entities (CNE) for connecting users and for performing the functions on the data; and a set of forwarding entities (SFE) for forwarding the data between the CPE and the CNE. Each of the CNE are assigned to one or more of the CPE. At least part of the functions performed by one or more of the CNE are split and offloaded to the assigned CPE for performing the part of functions. The method includes: determining: a) network information, including network topology information and network capability information of the network, b) entity location information, including network locations of the entities, and c) function splitting information, including possible configurable functions which can be split; and, based on the determined information of a)-c), jointly optimizing by one or more optimization procedures: routing between the network entities, assignments of a CNE to a CPE, and function splits.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 7 shows steps of an optimization procedure according to a further embodiment of the present invention; and FIG. 8 shows steps of a method according to a further embodiment of the present invention.

DETAILED DESCRIPTION

Figure 1:
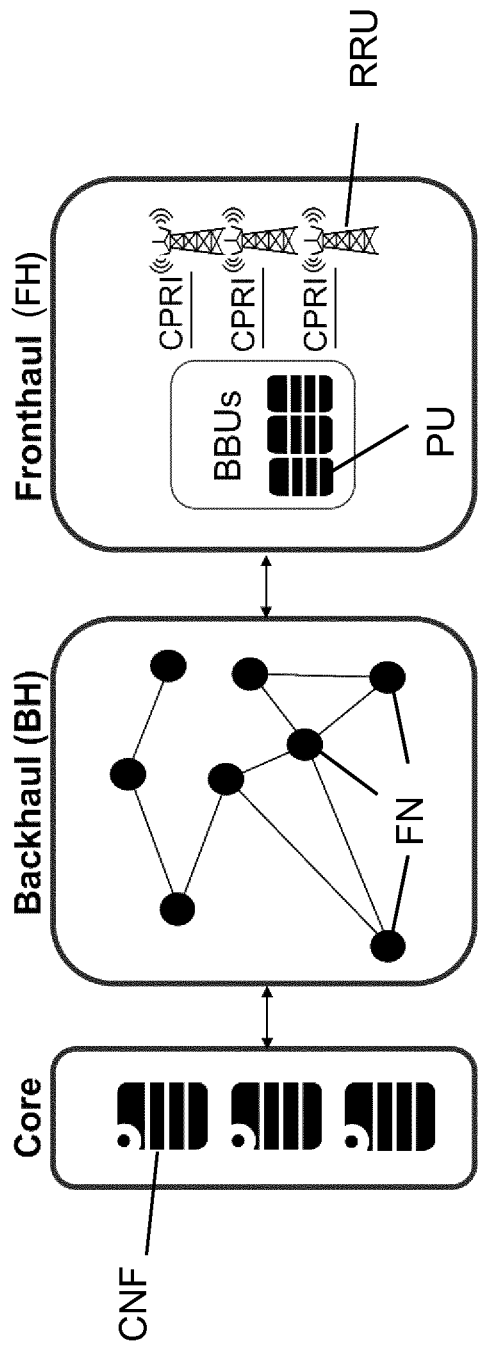
FIG. 1 shows schematically a conventional network including an access network.

An embodiment of the present invention provides a method for providing operation information for a network, the network including a set of computing entities, 'CPE', for performing functions on data, a set of connecting entities, 'CNE', for connecting users and for performing functions on data, a set of forwarding entities, 'SFE', and for forwarding data between the CPE and the CNE, where the CNE are assigned to one or more CPE, and where at least part of the functions performed by a CNE are split and offloaded to the assigned CPE for performing the part of functions.

An embodiment of the present invention further provides an operation computing entity for providing operation information for a network, the network including a set of computing entities, 'CPE', for performing functions on data and being connected to the core network, a set of connecting entities, 'CNE', for connecting users and for performing functions on data, and a set of forwarding entities, 'SFE', for forwarding data between the CPE and the CNE, where the CNE are assigned to one or more CPE, and where at least part of the functions performed by a CNE are splittable and offloadable to the assigned CPE for performing the part of functions.

An embodiment of the present invention even further provides a non-transitory computer readable medium storing a program configured to cause a computer to execute a method for providing operating information of a network, the network including a set of computing entities, 'CPE', for performing functions on data, a set of connecting entities, 'CNE', for connecting users and for performing functions on data, and a set of forwarding entities, 'SFE', for forwarding data between the CPE and the CNE, where the CNE are assigned to one or more CPE, and where at least part of the functions performed by a CNE are split and offloaded to the assigned CPE for performing the part of functions.

One of the problems addressed by embodiments of the invention is that conventional methods are not able to dynamically deciding an overall optimum functional split across all RRHs. Another one of the problems addressed by embodiments of the present invention is that conventional routing is not enough to support flexible RAN functional splitting in a crosshaul transport network.

In an embodiment, the present invention provides a method for providing operating information for a network, the network having:
1. a set of computing entities, 'CPE', for performing functions on data,
2. a set of connecting entities, 'CNE', for connecting users and for performing functions on data, and
3. a set of forwarding entities, 'SFE', for forwarding data between the CPE and the CNE.

Here, the CNE are assigned to one or more CPE, at least part of the functions performed by a CNE are split and offloaded to the assigned CPE for performing the part of functions, and the following are determined:
a) network information including network topology information network capability information of the network,
b) entity location information including network locations of the entities, and
c) function splitting information including possible configurable functions which can be split.

Also, based on the determined information of a)-c):
A) routing between the network entities,
B) assignments of CNE to CPE, and
C) function splits
are jointly optimized by one or more optimization procedures.

In a further embodiment, the present invention provides a computing entity for providing operating information for a network, the network having:
1) a set of computing entities, 'CPE', for performing functions on data,
2) a set of connecting entities, 'CNE', for connecting users and for performing functions on data, and
3) a set of forwarding entities, 'SFE', for forwarding data between the CPE and the CNE.

Here, the CNE are assigned to one or more CPE, at least part of the functions performed by a CNE are splittable and offloadable to the assigned CPE for performing the part of functions, and the computing entity is adapted to determine:
a) network information including network topology information network capability information of the network,
b) entity location information including network locations of the entities, and
c) function splitting information including possible configurable functions which can be split.

Also, the computing entity is adapted using one or more optimization procedures based on the determined information of a)-c) to jointly optimize:
A) routing between the network entities,
B) assignments of CNE to CPE, and
C) function splits.

In a further embodiment, the present invention provides a non-transitory computer readable medium storing a program configured to cause a computer to execute a method for providing operating information of a network, the network having:
1. a set of computing entities, 'CPE', for performing functions on data,
2. a set of connecting entities, 'CNE', for connecting users and for performing functions on data, and
3. a set of forwarding entities, 'SFE', for forwarding data between the CPE and the CNE.

Here, the CNE are assigned to one or more CPE, at least part of the functions performed by a CNE are split and offloaded to the assigned CPE for performing the part of functions, and the following are determined:
a) network information including network topology information network capability information of the network,
b) entity location information including network locations of the entities, and
c) function splitting information including possible configurable functions which can be split.

Also, based on the determined information of a)-c):
A) routing between the network entities,
B) assignments of CNE to CPE, and
C) function splits
are jointly optimized by one or more optimization procedures.

At least one embodiment may have at least one of the following advantages:
Higher-capacity networks in dense deployments;
Better infrastructure utilization (CAPEX/OPEX);
Compatibility with legacy Base Stations and other legacy infrastructure.

In other words, embodiments of the present invention provide or enable considering jointly the optimization of routing between computing entities and connecting entities, the assignment of connecting entities to computing entities and the connecting entities functional split in contrast to conventional methods and systems.

The terms "computing entity", "connecting entity", "forwarding entity" refer in particular in the claims, preferably in the description each to an entity adapted to perform computing like a personal computer, a tablet, a mobile phone, a server, or the like and includes one or more processors having one or more cores and may be connectable to a memory for storing an application which is adapted to perform corresponding steps of one or more of the embodiments of the present invention. Any application may be software based and/or hardware based installed in the memory on which the processor(s) can work on. The entities may be adapted in such a way that the corresponding steps to be computed are performed in an optimized way. For instance different steps may be performed in parallel with a single processor on different of its cores. Further a plurality of same or different entities may be identical forming a single computing entity. The entity or entities may also be instantiated as a virtual entity running on a single or a plurality of physical computing resources. Different entities may therefore be executed on the physical computing resource.

The term "computer readable medium" may refer to any kind of medium, which can be used together with a computation device or computer and on which information can be stored. The information may be any kind of data which can be read into a memory of a computer. For example the information may include program code for executing with the computer. Examples of a computer readable medium are tapes, CD-ROMs, DVD-ROMs, DVD-RAMs, DVD-RWs, BluRay, DAT, MiniDisk, solid state disks SSD, floppy disks, SD-cards, CF-cards, memory-sticks, USB-sticks, EPROM, EEPROM or the like.

The term "assigning" with regard to computing entities and connecting entities refers in particular in the claims, preferably in the specification to the virtual process of linking the entities together for performing a set of functions which are divided or separated to be performed on the linked entities.

The term "function" refers in particular in the claims, preferably in the specification to any kind of atomic, mathematical, higher level, or virtual function which can be performed by a computing entity. For example an atomic function may be to shift values within a memory of the entity. An example for a virtualized function may be any kind of combination of functions of different entities. For example a mathematical function is the addition or multiplication of two values. For instance an example for a higher level function is a function to collect network topology information.

The term "split" with regard to the term "function" refers in particular in the claims, preferably in the specification to any division or part of a set of functions which can be separated and performed on the same or a different entity.

The term "jointly" with regard to "optimization" or "optimization procedure" refers in particular in the claims, preferably in the specification to a procedure between different entities directed to the same goal or target such that certain aspects or the like necessary or relevant to reach the goal or target are not optimized separately and/or sequentially but are optimized in such a way that amendments performed with regard to one aspect cause deviation(s) or amendment(s) in a second aspect and vice versa so that both aspects are optimized together. This is in particular in contrast to conventionally first optimize the first aspect and then based on the result of the first aspect optimize the second aspect without considering effects of the second aspect onto the first aspect. For instance conventionally first the assignment of CNE to CPE is optimized due to the latency and then the functional split is optimized with fixed assignment. In contrast thereto a joint optimization according to embodiments of the present invention considers for instance both latency and functional split such that both are amended such that a joint optimized result is achieved.

The term "optimization procedure" is to be understood in its broadest sense and refers in particular in the claims, preferably in the specification to any kind of procedure, method and/or algorithm which optimizes a certain system arrangement of entities or the like according to one or more variables. One or more different optimization procedures may be used to determine a joint optimization to combine the results of the different optimization procedures.

The term "cost" with regard to the term "function" is to be understood in its broadest sense and refers in particular in the claims, preferably in the specification to any virtual or real cost associated with one or more parameters of a system. For example, a virtual cost may be a resource consumption of memory and for instance a real cost may be the cost for purchasing data traffic between two entities.

The term "link" with regard to the terms "capacity" and "delay" is to be understood in its broadest sense and refers in particular in the claims, preferably in the specification to a connection between at least two different entities.

Further features, advantages and further embodiments are described or may become apparent in the following:

One of the optimization procedures may use an overall cost function including a plurality of cost functions representing effects of different changeable parameters of the network. The overall cost function enables in a flexible way to adapt to the needs of an operator a corresponding optimization of the network. The operator may flexibly use cost functions for different parameters and combine them to an overall cost function which can be then optimized by one or more optimization procedures.

The cost functions may represent traffic of the CNE and computing resources required for processing functions on the CNE and the CPE. This enables to efficiently optimize the utilization of the network with the cost functions.

The overall cost function may be minimized for the joint optimization. This enables to provide in an easy way an optimized utilization for the network.

Constraints may be used during the optimization procedure, where the one or more constraints represent at least one of: link delay between different entities, link capacity between different entities. This enables to ensure that delay requirements are fulfilled and/or capacity violations are avoided.

Link delay may be used additively between different links. When determining the overall link delay on connection between different entities on a certain path through the network the link delay of the plurality of sequential links between two entities is simply added without considering queuing effects. This allows in an easy way to determine an overall link delay on a network path.

Link capacity may be represented by a binary function indicating that a link capacity threshold is exceeded or not. This allows in an efficient way to compute and determine a corresponding capacity violation.

One of the optimization procedures may use for optimization a branch-and-bound based algorithm or a greedy algorithm. This enables in a flexible way to use algorithms according to computational resources provisioned. A branch-and-bound based algorithm provides an optimal search however needs more computational time, whereas a greedy algorithm is compared to the branch-and-bound based algorithm-suboptimal but it is polynomial and has a good convergence time.

The one or more optimization procedures may be performed on a centralized computing entity. This allows optimizing the execution of the optimization procedure or the complete method on a single centralized entity. Moreover information can be provided to a single entity only for performing the method. Thus location information of entities can be sent to all entities in a fast and easy way.

The access network may include a radio access network, where the CNE may be provided in form of base stations for user equipment. This enables in an easy way to apply the method to radio access networks according to 3GPP.

At least one of the cost functions may be a linear function. This allows a fast and reliable computation of the cost functions.

The functions may be in at least part provided as virtualized network functions. This allows using in a flexible way functions without the need to consider the underlying physical entity.

The computing entity may be a centralized entity in the network. This allows optimizing the execution of the methods on a single centralized entity. Moreover information can be provided to single entity only for performing the method. Thus location information can be sent to all entities in a fast and easy way.

There are several ways how to design and further develop the teaching of the present invention in an advantageous way. To this end it is to be referred to the patent claims subordinate to the independent claims on the one hand and to the following explanation of further embodiments of the invention by way of example, illustrated by the figures on the other hand. In connection with the explanation of the further embodiments of the invention by the aid of the figures, generally further embodiments and further developments of the teaching will be explained.

FIG. 1 shows schematically a conventional network including an access network.

In FIG. 1 a core network providing core network functions CNF is connected to a backhaul network BH including a plurality of forwarding nodes FN. The backhaul network BH is connected to a fronthaul network FH including a plurality of base band units BBU with processing units PU, which are connected via a common public radio interface CPRI to a plurality of remote radio units RRU. The term remote radio unit RRU is similarly used with remote radio head RRH.

The BBU are connected to the core network through the backhaul network BH in form of a conventional packet-based switching network.

Figure 2:
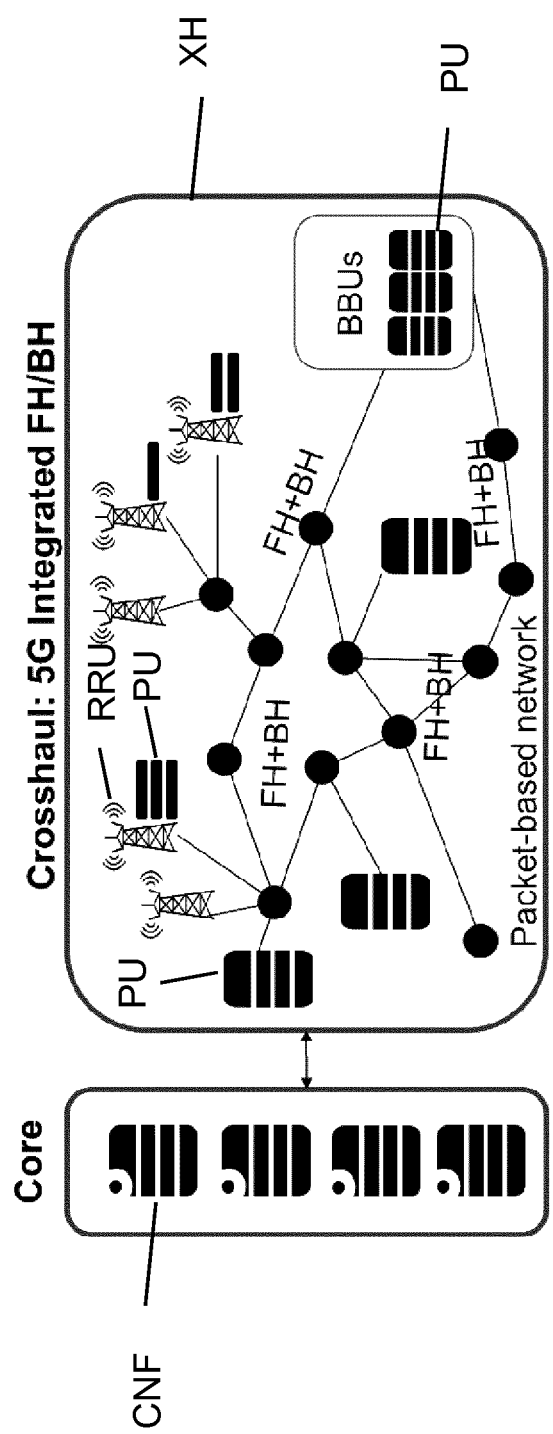
FIG. 2 shows schematically a conventional crosshaul network.

FIG. 2 shows schematically a conventional crosshaul network.

In FIG. 2 a crosshaul network, i.e. an integrated backhaul/fronthaul network FH/BH is shown. As in FIG. 1 the core network provides core network functions CNF and is connected to the crosshaul network XH. The crosshaul network XH includes a plurality of forwarding nodes forwarding FH+BH traffic, processing units PU and remote radio units RRU. The common crosshaul network XH routes traffic from the backhaul and the fronthaul network each having different requirements, for example different splits and the traffic is transported over common packet-based switching infrastructure.

For instance, on the one hand, an adequate routing instance that steers traffic from/to centralized computing pools CCPs or processing units PU to/from RRHs across the XH requires knowledge of the functional split (number of functions offloaded) of the RRHs and the location of the CCP it is paired with because these impose a set of traffic constraints that shall be satisfied (e.g. bandwidth requirements, delay or jitter tolerance values). A proper choice of functional splits across the RAN may depend on the XH transport resources (e.g. available bandwidth, end-to-end latency or jitter performance) which in turn depend on the actual routing instance (e.g. some links may be shared between different RRHs).

Figure 3:
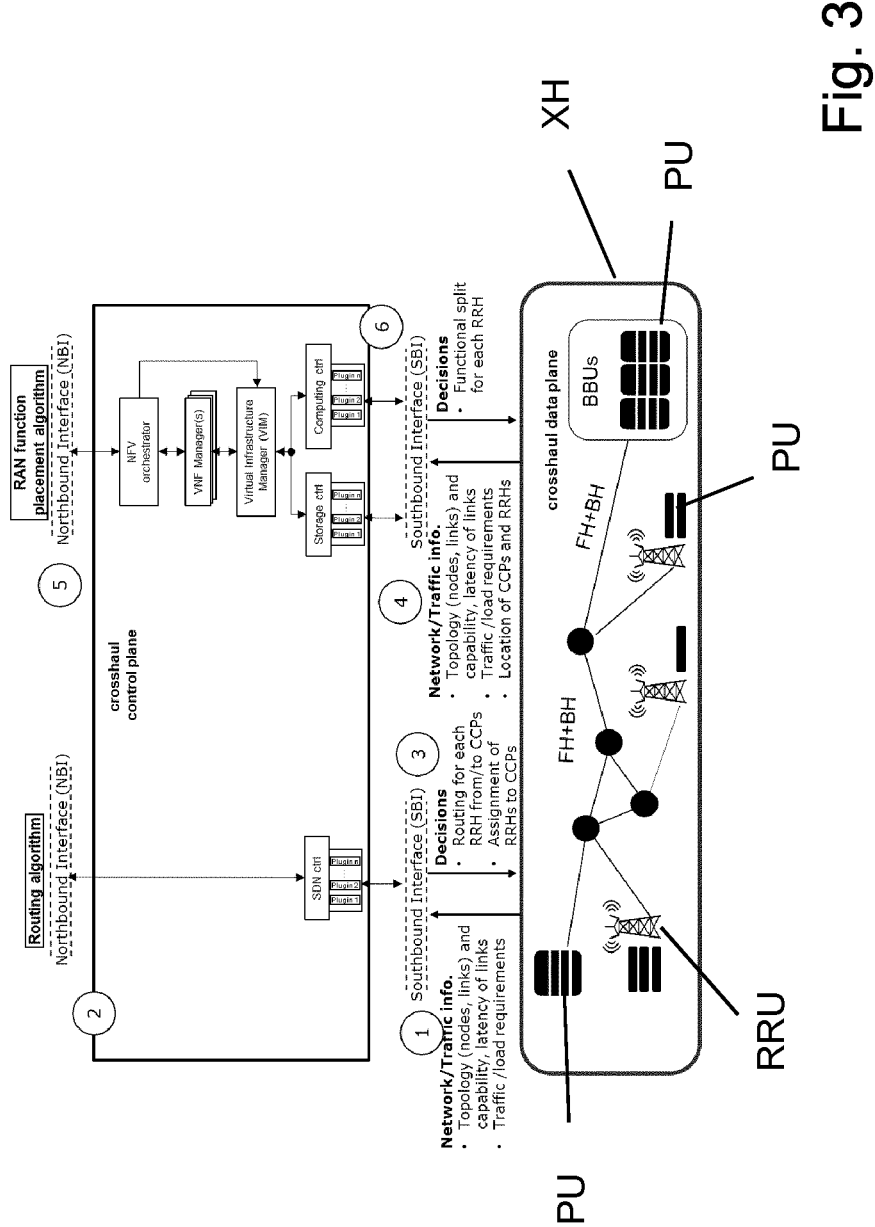
FIG. 3 shows a conventional method for operation of a conventional network.

FIG. 3 shows a conventional method for operation of a conventional network.

In FIG. 3 steps of a crosshaul resource management with conventional methods is shown:

Conventional routing algorithms can take path decisions to steer flows from RRHs to CCPs based on a different criteria, for instance to minimize the latency of the flows, maximize the amount of flow carried in these paths or a combination of these and other criteria. FIG. 3 illustrates how conventional resource management can only be done independently in two stages. For instance, FIG. 3 shows an example where in the first stage an SDN controller collects information related to the substrate network (location of nodes, characteristics of network links, etc.) and makes routing decisions accordingly based on some criteria, e.g. favouring shortest paths or high-capacity paths, where assignments of CCPs to RRHs is predetermined. In the second stage, the network capability of the crosshaul network XH can be computed considering the routing decisions taken in the first stage.

Based on this, choices on the amount of centralization can be taken based on some search method for instance and enforced via the NFV-based architecture depicted in FIG. 3. This has the disadvantage that the routing choices are taken without considering the different trade-offs between centralization and traffic demands that flexible functional splitting allows and thus only suboptimal decisions can be taken.

Figure 4:
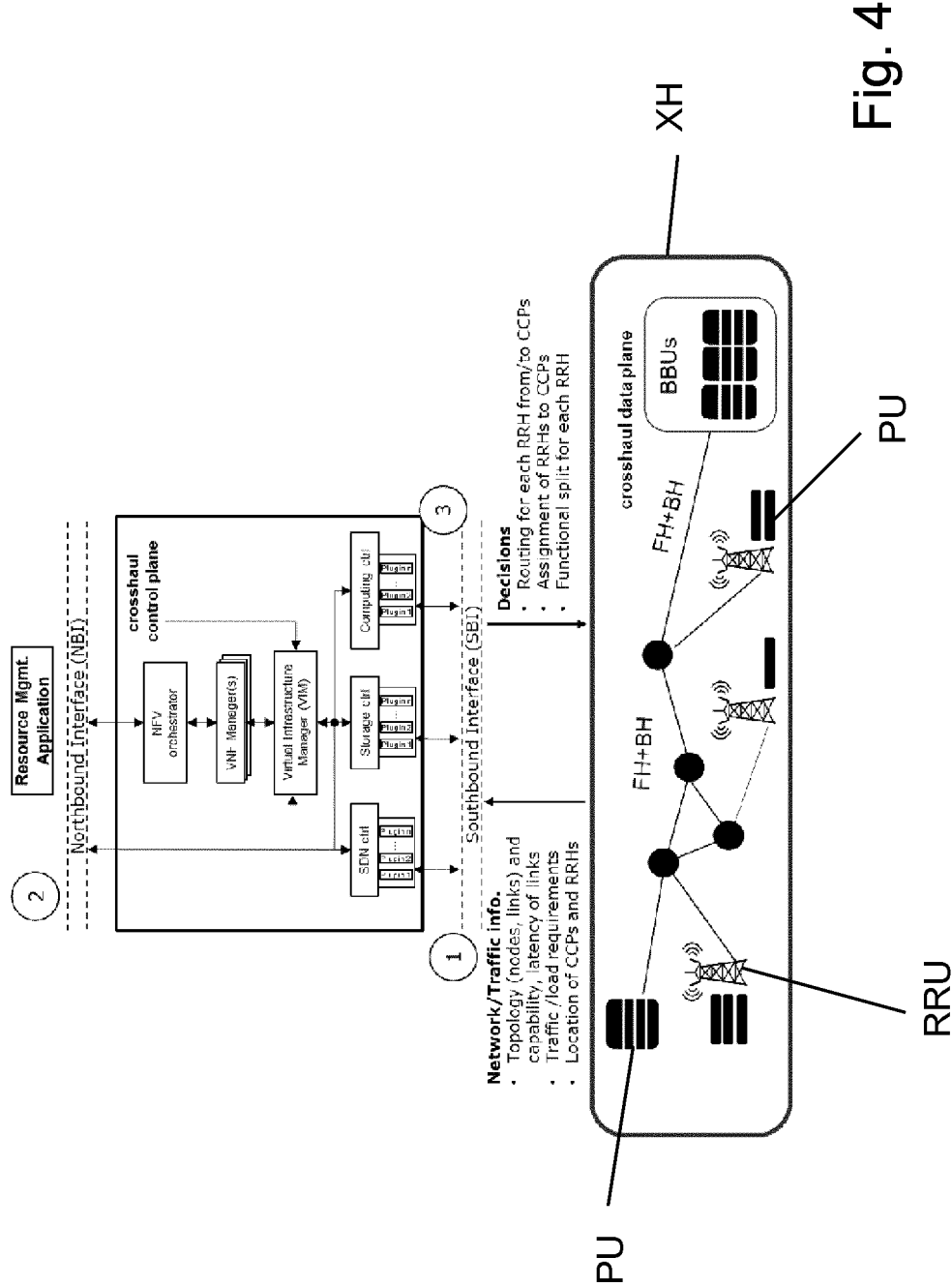
FIG. 4 shows a network and method according to an embodiment of the present invention.

FIG. 4 shows a network and method according to an embodiment of the present invention.

In FIG. 4 steps of a crosshaul resource management according to an embodiment of the present invention is shown.

In contrast to FIG. 3, FIG. 4 illustrates the following: First, the information of the substrate network is collected (similarly as in FIG. 3). Second, the control plane provides the abstraction of network topology and related information to the resource management algorithm, which jointly optimizes routing and functional placement in the crosshaul network (see second step). Finally, a software-defined network SDN/network virtual function NFV platform distributes the different functions between RRHs and CCPs with the support of SDN/NFV components and different controllers, e.g. SDN for controlling networking resources, and computing and storage controller for function virtualization and chains the functions with the SDN controller using the computed routes. The advantage is that e.g. some routes can favor higher level of centralization, which impose higher capacity demands and lower delay tolerance in some areas (where/when needed) by sacrificing capacity or impose higher latency in some other parts of the crosshaul network where less centralization is required.

The embodiment of FIG. 4 can be used for planning purposes, e.g. building an understanding on where CCPs can be deployed if a given level of centralization is desired or as a dynamic tool where the level of centralization maps the needs of the network over the run time of the system. In the latter case dynamic routing choices may be taken in such a way that dynamic configuration of the level of centralization is supported over the operation run time.

Figure 5:
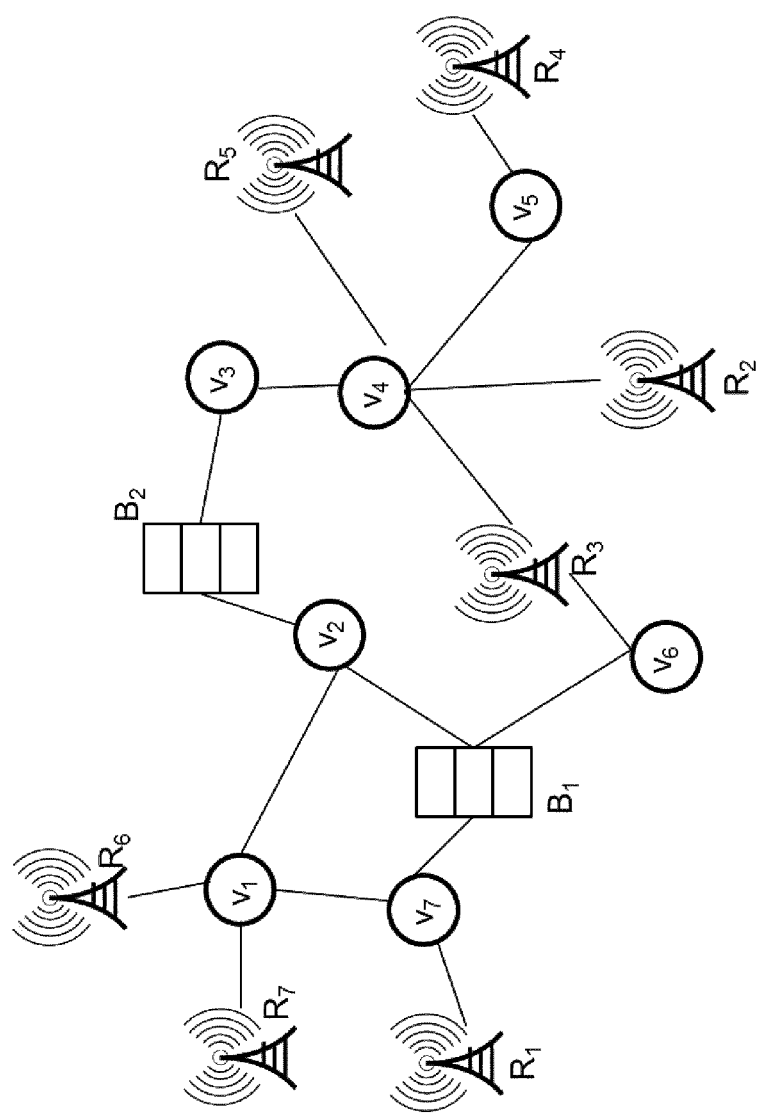
FIG. 5 shows a scenario for an embodiment to a further embodiment of the present invention.

FIG. 5 shows a scenario for an embodiment to a further embodiment of the present invention.

In FIG. 5 a scenario according to an embodiment is shown on which to optimization procedures are performed such that joint decisions can be taken by the resource management building block as shown in FIG. 4.

In the following only downlink traffic is considered but the uplink can be considered similarly.

Further the functionality of a Base Station BS is assumed to be decomposed into any set of H atomic functions (this could be virtual functions): $\mathcal{F} := \{f_1, \ldots, f_H\}$ which must be processed sequentially from $f_1$ to $f_H$ before remote radio units RRU perform the final analog processing, digital-to-analog conversion and signal irradiation to the users, etc.

An integrated fronthaul/backhaul network, namely the crosshaul XH network, as depicted in FIG. 5 is considered, including:

a set of M Centralized Computing Pools datacenters CCPs $\mathcal{B} := \{B_1, \ldots, B_M\}$ capable of:
  Receiving data traffic from the mobile core domain;
  Processing any function $f \in \mathcal{F}$ onto such traffic;
  Forwarding the processed traffic to the RRHs (downlink).

a set of N Remote Radio Units RRHs $\mathcal{R} := \{R_1, \ldots, R_N\}$ capable of:
  Receiving processed traffic or raw traffic from a CCP.
  Processing any function $f \in F$ onto such traffic;
  Performing the final analog processing, digital-to-analog conversion and signal irradiation to the users (downlink).

a packet-based network of packet forwarding elements (e.g. switches) $\mathcal{V} := \{v_1, \ldots\}$ that connects CCPs with RRHs by means of communication links such that $l_{i,j}=1$ denotes the existence of a direct bidirectional link between nodes i and j, and $l_{i,j}=0$ denotes its inexistence.

The collection of all nodes is denoted by $\mathcal{N}:=\mathcal{B}\cup\mathcal{R}\cup\mathcal{V}$, and CCPs are assumed to be connected to the operator's core network core with no bottleneck, thus acting as gateways to the mobile core.

Here the CCP m is in charge of processing a subset of $\theta_{m,n}\subseteq\mathcal{F}$ on behalf of RRH n. Thus, each RRH is in charge of processing the remaining functions in $\mathcal{F}$, i.e., $\overline{\theta}_n:=\mathcal{F}\setminus\cup_{m\in\mathcal{B}}\theta_{m,n}$. A one-to-one mapping is improved between CCPs and RRHs and therefore $\theta_{m,n}=\emptyset$, $\forall m\in\mathcal{B}\setminus\{A(n)\}$, where A(n) returns the CCP assigned to RRH n (i.e. all are null except the CCP assigned to RRH n). Conventional scenarios, like Cloud RAN (CRAN) can be modeled by setting $\theta_{A(n),n}=\mathcal{F}$ and $\overline{\theta}_n=\emptyset\forall n\in\mathcal{R}$, conventional backhauling with $\theta_{m,n}=\emptyset$ and $\overline{\theta}_n=\mathcal{F}$, $\forall m\in\mathcal{B}$, $\forall n\in\mathcal{R}$, and any other configuration between these two. Here the existence of a heterogeneous network for the fronthaul (rather than point-to-point links which the C-RAN considers) is assumed and further a flexible transport protocol that is capable to carry IQ samples (raw data representing a wireless modulated signal) from CCPs to RRHs as well as conventional backhaul traffic onto the same substrate (switching-based) infrastructure being in line with the context of the Next Generation Fronthaul Interface, NGFI.

Hence the network of FIG. 5 transports N flows in $\mathcal{U}:=\{U_n:\forall n\in\mathcal{R}\}$ with different demands that depend on the functional split of each flow (see e.g. Table 1 above). Due to a one-to-one mapping between each flow in $\mathcal{U}$ and each RRH in $\mathcal{R}$, it is referred to both indistinctly in the specification.

The path followed by flow $U_n$ includes a subset of the forwarding elements $\mathcal{P}_{m,n}\subseteq\mathcal{V}$ from CCP m=A(n) to RRH n such that for any $v_i\in\mathcal{P}_{m,n}$ there is exactly another $v_{j\neq i}\in\mathcal{P}_{m,n}$ such that $1_{v_i,v_j}=1$ (i.e. no loops). If CCP m≠A(n), i.e. one which does not serve RRH n, then $\mathcal{P}_{m,n}=0$.

The transport network between CCPs and RRHs may satisfy the traffic (delay/throughput) requirements of a given functional split $\theta:=\{\theta_{m,n}\forall m\in\mathcal{B}, \forall n\in\mathcal{R}\}$. In turn, the transport capacity inherently may depend on the routing choice $\mathcal{P}:=\{\mathcal{P}_{m,n}:\forall m\in\mathcal{B}, \forall n\in\mathcal{R}\}$ that steers traffic from CCPs to RRHs, e.g. some links may be shared by more than one flow. Thus transport routing $\mathcal{P}$ and functional split $\theta$ must be optimized jointly.

Figure 6:
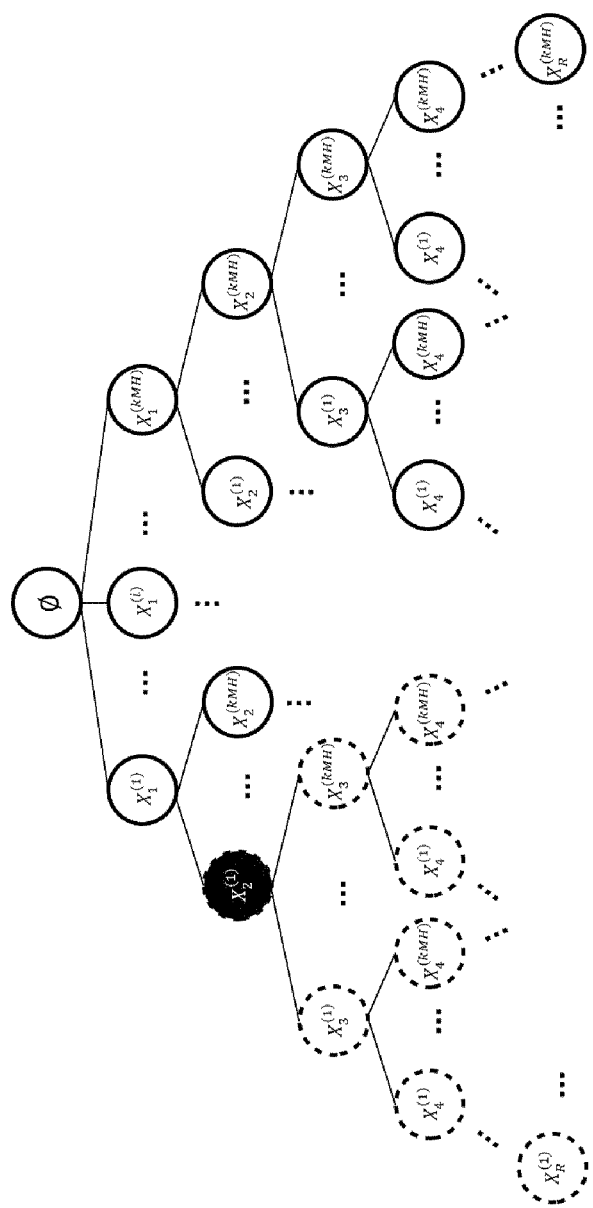
FIG. 6 shows schematically part of a method according to a further embodiment of the present invention.

FIG. 6 shows schematically part of a method according to a further embodiment of the present invention.

To jointly optimize transport routing and functional split a cost function O may be specified:

In general, this has the shape of:

$$O:=\sum_{m=1}^{M}\sum_{n=1}^{N}c_1(\mathcal{P}_{m,n},\theta_{m,n},r_n)+\sum_{m=1}^{M}\sum_{n=1}^{N}c_2(\theta_{m,n},r_n)+\sum_{m=1}^{M}\sum_{n=1}^{N}c_3(\overline{\theta}_n,r_n)$$

$c_1(\mathcal{P}_{m,n},\theta_{m,n},r_n)$ models here the cost incurred by the traffic of RRH n∈$\mathcal{R}$ in the transport network (e.g. leasing transport resources in form of required capacity). This cost depends on the traffic requirements (load) of the split chosen for RRH n, $\theta_{m,n}$, which may depend on the user load $r_n$ as well as on the routing decisions for CCP m, i.e. $\mathcal{P}_{m,n}$.

$c_2(\theta_{m,n},r_n)$ models the cost associated to the computing resources required for processing BS functions at the CCPs and thus depends on the split chosen for RRH n, e.g. the incurred computational load $\theta_{m,n}$ and the user load $r_n$.

$c_3(\overline{\theta}_n,r_n)$ models the cost associated to the computing resource required for processing at each RRH n required by the split chosen, e.g. the incurred computational load.

For instance, $$c_1(\mathcal{P}_{m,n},\theta_{m,n},r_n)=K_1\cdot\sum_{\substack{v_iv_j\in\mathcal{P}_{m,n}\\v_i\neq v_j}}l_{v_i,v_j}\cdot b(\theta_{m,n},r_n)$$

$$c_2(\theta_{m,n},r_n)=K_2\cdot S(\theta_{m,n},r_n)$$

$$c_3(\theta_{m,n},r_n)=K_3\cdot S(\overline{\theta}_n,r_n)$$

where $b(\theta_{m,n},r_n)$ and $S(\theta_{m,n},r_n)$ are mapping functions, which are non-continuous in general, that expose the raw bit-rate traffic and computational resource units, respectively, that let RRH n serve $r_n$ user data traffic load given split choice $\theta_{m,n}$. This example here implies a linear cost per bit forwarded for $c_1$ and processed for $c_1$ and $c_2$.

Because here it is assumed that the expected user load required is fixed and known, minimizing the operational costs of the network will maximize the net profit as well. Thus the solution $$\underset{\mathcal{P},\theta}{\text{argmin}}\,O$$

provides an optimization.

C-RAN configuration will minimize the above cost function in most scenarios of interest. However, the stringent requirements of this split option may violate some capacity or delay constraints in the underlying network.

A first set of constraints is aimed to satisfy the delay requirements:

$$\sum_{\substack{v_iv_j\in\mathcal{P}_{m,n}\\v_i\neq v_j}}l_{v_i,v_j}\cdot\delta_{l_{v_i,v_j}}\leq d(\theta_{m,n},r_n),\,\forall\,m\in\mathcal{B},\forall\,n\in\mathcal{R}$$

where $\delta_{l_{i,j}}$ is the propagation delay of link $l_{i,j}$ and $d(\theta_{m,n},r_n)$ is the delay requirement of functional split $\theta_{m,n}$ given a user load $r_n$. Here it is assumed that it is an additive constant (i.e. queueing effects are not considered). Similarly constraints on jitter requirements may be set if gaussian delays are present; however, jitter could be removed at the cost of additional latency (which is covered by the above constraints) by deploying buffers at the receiver.

The second set of constraints guarantees no capacity violations:

$$\sum_{m=1}^{M}\sum_{n=1}^{N}I(v_i,v_j,\mathcal{P}_{m,n})\cdot b(\theta_{m,n},r_n)\leq\beta_{l_{v_i,v_j}},\,\forall\,v_i\neq v_j\in\mathcal{N}$$

where $\beta_{l_{i,j}}$ is the total bit-rate capacity of link $l_{i,j}$ and $I(v_i, v_j, \mathcal{P}_{m,n})$ is an indicator function which is 1 if $v_i$ and $v_j$ are contained in $\mathcal{P}_{m,n}$ and 0 otherwise.

To provide an optimization procedure for the solution $$\underset{\mathcal{P},\theta}{\arg\min} O$$

the following steps are performed: the duple $X_n:=\{\theta_{m,n}, \mathcal{P}_{m,n}|\forall M\in\mathcal{B}\}$ describes the configuration of one flow $U_n$ (pair CCP m-RRH n) and $X:=\{X_n, \forall n\in\mathcal{R}\}$ is set as a candidate solution. Hence the goal is to find the optimal $X^*$ that minimizes the above cost function. The optimization procedure may run on a central controller which has a complete view of the underlying infrastructure and is capable of instantiating routes and split options.

The problem formulated above can be seen as a generalization of the Unsplittable Flow Problem where traffic demands are to be also optimized. This is thus an NP-hard problem. In the following two possible combinatorial solvers are provided: The first one is an optimal searching algorithm that can be useful for scenarios with low number of RRHs, and the second algorithm is a sub-optimal greedy algorithm that is polynomial and has good convergence time.

The first algorithm is a brand-and-bound algorithm and begins by computing the k paths with shortest end-to-end delay (latency) for each pair CCP m-RRH n. This can be readily obtained with k-shortest path routing versions of Dijkstra, for example. This renders a set of k·M candidate paths for each RRH n, $\Pi_n:=\{\mathcal{P}_{m,n}^{(1)}, \ldots, \mathcal{P}_{m,n}^{(k\cdot M)}\}$ and solves the problem of CCP selection jointly with the routing problem in a simplified manner, i.e. by selecting the best $\pi_i \in \Pi_n$, for each $n \in \mathcal{R}$ (which solves the CCP selection problem).

The main challenge here is the usually large space of candidate solutions to explore, i.e. $(k\cdot M)^N \cdot |\mathcal{F}|^N$ possible solutions. In order to reduce such huge space, joint processing of data from a set of RRHs is used only if it is done within the same CCP. Moreover, there is no gain if different RRHs for which joint processing is expected had different split choices. Therefore the set of RRHs is assumed to be partitioned into $Q:=\{q_1, q_2, \ldots\}$ clusters where cluster $q_i$ contains a set of RRHs that are constrained to have the same split choice and same CCP. All RRHs must be included in exactly one cluster (they could be alone in the cluster) and no clusters are empty (i.e. $|Q| \leq N$). An RRH can still follow a route to its CCP that is different to that of another RRH within the same cluster, although the CCP is the same. This brings down the space of candidate solutions to $k^N \cdot M^{|Q|} \cdot |\mathcal{F}|^{|Q|}$, unless $|Q|=N$.

Now an optimal branch and bound-based backtracking approach essentially exploring the discrete (but typically large) space of candidate solutions. Such space can be represented as a tree where a node in level n represents a configuration set $X_n$ for RRH n, and thus a branch (with N+1 levels, including the root of the tree as level 0) represents a candidate solution X. The main steps are the following:

Initialization phase: This type of algorithms keeps track of an upper bound on the optimum cost which is typically tightened as the algorithm advances. At the initialization phase, this bound is set to infinity, though the resulting costs of the greedy approach described below can be use as a tighter initial upper bound.

Branching. The branching method is based on a Depth-First-Search (DFS) tree-exploring method. Each level of the tree represents a configuration $X_n=\{\theta_{m,n}, \mathcal{P}_{m,n}|\forall M\in\mathcal{B}\}$ set for RRH n and thus branching implies selecting a candidate configuration $X_{n+1}$ for RRH n+1. To minimise the running time it may be relevant that reasonably good solutions are explored early. This enables to maximise the amount of pruning done over the tree, i.e. sections that do not have to be explored. In order to do that, first all the candidate configurations for each RRH n, $\{X_n^{(1)}, X_n^{(2)}, \ldots, X_n^{(k\cdot M\cdot|\mathcal{F}|)}\}$ are sorted, in a descending order following a score function $F_{X_n^{(i)}}$ and branching is carried out following this order, e.g. the first configuration to branch is the one with higher $F_{X_n^{(i)}}$ score. However, not all $X_n^{(i)}$ possible configurations are feasible; for instance, if the algorithm is exploring level n and some parent node (any node up to the root) corresponds to the same cluster as the RRH mapped by level n, such RRH is constrained to using the same functional split and CCP as decided in the branch for that cluster. This reduces the set of candidate configurations from $k\cdot M\cdot|\mathcal{F}|$ to just k, i.e. only a path towards the CCP has to be decided.

The mapping of tree levels to RRHs is similarly done in a descending order according to an aggregate function of all candidate configurations of each RRH, for instance, $\Sigma_i F_{X_n^{(i)}}$.

The goal of such sorting approach is that a configuration $X_n^{(i)}$ with higher score $F_{X_n^{(i)}}$ shall have a higher likeliness to be the best configuration for our optimization problem. To this aim, a possible definition of $F_{X_n^{(i)}}$ is:

$$F_{X_n^{(i)}} := \frac{W(\theta_{m,n}, \mathcal{P}_{m,n}, r_n)}{\Sigma_{p\in\phi_{\mathcal{P}_{m,n}}} \frac{b(\theta_{m,n}, r_n)}{\min_{l_{i,j}\forall i,j\in p} \beta_{l_{i,j}}}},$$

where $W(\bullet)$ is a reward function for using split $\theta_{m,n}$ and path $\mathcal{P}_{m,n}$. This can be extracted directly from the cost model, e.g. reversing its sign). $F_{X_n^{(i)}}$ represents thus the reward of using split $\theta_{m,n}$ via path $\mathcal{P}_{m,n}$ relative to a rough estimation of the network overload such choice would cause to the whole network. The denominator sums up the amount of network resources required by flow n relative to the capacity of a path p for all paths which has some link in common with $\mathcal{P}_{m,n}$ (these are collected in set $\phi_{\mathcal{P}_{m,n}}$.

Backtracking. Every time a new level of the tree is explored, a larger partial candidate solution to the optimization problem is found, until the depth of the tree is reached where a complete candidate solution is obtained. Now, every time a node of the tree is explored, it is checked that the current partial candidate solution does not violate any constraints of the optimization problem. For all those RRHs that are lower in the tree for which a candidate configuration is not yet known, lower bounds on the network resources are computed that it requires and check constraints for all those links that are shared across all candidate paths (i.e. links that surely will be in the final solution for this RRH). If constraints are violated, the hanging branches are pruned (no further sub-branches are explored) and the optimization algorithm backtracks to a sibling node.

Bounding. If the test is negative, meaning no constraint violation, a lower bound on the cost achievable by that solution being explored is computed. To this aim, the cost of the partial solution is computed and the minimum cost is added that each of the hanging nodes (RRH configurations) could have; this is a lower bound of the cost of the branch being explored. If this is larger than the current upper bound, the hanging branches are pruned and move on to a sibling node.

Finally, if the depth of the tree is reached, this branch becomes the new best candidate solution and its cost the new upper bound on the optimum cost for the optimization problem. This method is illustrated in the embodiment of FIG. 6. In FIG. 6, when visiting node $X_2^{(1)}$ (shaded node), the optimization algorithm finds that the candidate $X=\{X_1^{(1)}, X_2^{(1)}, -, \ldots\}$ violates some network constraints or that its lower bound exceeds the best cost found so far. In light of that, the hanging branches are pruned and the optimization algorithm backtrack to visiting $X_2^{(2)}$.

This optimization algorithm has the additional advantage of being highly parallelizable, which makes sense in this case given that it will most probably run offline in distributed cloud computing platforms.

FIG. 7 shows steps of an optimization procedure according to a further embodiment of the present invention.

FIG. 7 is suboptimal but quick combinatory greedy algorithm implemented is provided:

The algorithm assumes that $X_{x_n}^{(i)}$ has been computed for all possible $X_n^{(i)}$ and all RRHs n. $\theta_q$ denotes here the functional split $\theta_{A(n),n}$ for any RRH n in cluster $q \in Q$ (since all of them shall have the same setting).

The algorithm greedily increases the functional split setting of the cluster which has larger number of RRHs and (roughly estimated) higher likeness to satisfy constraints. This is essentially done by computing $\alpha_q$, $\forall q \in Q$ as $$\alpha_q = \sum_{n \in q} \max\left\{F_{x_n, \theta_{q'} = \{\theta_q, f | \theta_q | + 1\}}\right\}$$

Bigger clusters will thus contribute to increasing $\alpha_q$ (because of summing up across all RRHs within such cluster), and, given that larger $F_{x_n}$ has (roughly) higher chances of meeting constraints (because, roughly estimated, it overlaps with less and higher-capacity links used by other RRHs), those clusters with RRHs that have good best potential configurations will also contribute to increasing $\alpha_q$. Thus, higher clusters with higher $\alpha_q$ are in better position to cause less damage if their split is increased while also provide higher improvement over the cost function (because they are larger clusters).

Other $\alpha_q$, e.g. normalizing $\alpha_q$ with the number of RRH in the cluster may be defined, i.e.

$$\alpha_q = \frac{\sum_{n \in q} \max\left\{F_{x_n, \theta_{q'} = \{\theta_q, f | \theta_q | + 1\}}\right\}}{N}.$$

For every split change, a joint CCP is tried to be found and a routing instance by means of find_routes( ). If the number of CCPs is small, a simple branch-and-bound algorithm can be applied or a simple exhaustive search approach to make the CCP assignment embedded in find_routes( ). Now, for every potential CCP assignment an Unsplittable Flow Problem (UFP) has to be solved, i.e. finding the best single-path routing solution between each RRH and the assigned CCP. For this, any conventional approach may be used. For instance, if the network is small, some searching algorithms (branch and bound again) can be applied. Alternatively, a weighted shortest-path routing (propagation delays being the weights) to each RRH in a descending order of latency requirements (i.e. starting from the RRHs with splits with lowest delay tolerance) can be greedily applied. Another alternative is to use any of the conventional approximation algorithms to address the UFP. Some instances the embodiment of the invention may not care about network costs (e.g. they own the physical infrastructure or costs are not bit-rate dependent). In such case, any feasible routing instance can be used (no need to find the best).

Finally, the algorithm stops when a feasible routing instance could not be found. In such case, the algorithm returns the last feasible split/routing solution.

FIG. 8 shows steps of a method according to a further embodiment of the present invention.

In FIG. 8 a method to jointly optimize decisions on (i) routing from RRHs from/to Centralized Processing Pools (CCPs), (ii) the assignment of RRHs to CCPs and (iii) the RRHs' functional split, including the steps of
1) Collection of information:
   a. Network topology and capabilities (link capacities and link latencies);
   b. Location of CCPs and RRHs;
   c. Configurable functional splits and the requirements of each of them.
2) SDN-based (i.e. centralized) orchestration of routing instances.
3) (optional) NFV-based deployment of RAN functions as VNFs.

In summary the present invention enables or provides a joint optimization of routing from RRHs from/to centralized processing pools CCP, the assignment of RRHs to CCPs and the RRHs functional split. Embodiments of the present invention may target the minimization of a cost function in terms of for example computational complexity, energy consumption and/or CAPEX/OPEX.

At least one embodiment of the present invention may have at least one of the following advantages:
1) Higher-capacity networks in dense deployments;
2) Better infrastructure utilization (CAPEX/OPEX).
3) Compatibility with legacy Base Stations and other legacy infrastructure.

The present invention further provides in particular joint consideration of routing and RRH functional splitting which enables to efficiently optimize the utilization of a network: Jointly and dynamically an optimization can be performed in such a way that routing changes and/or functional split changes will go hand in hand to maintain an optimum level of centralization at all times. Further, performance and cost gains are achieved.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for optimizing a configuration of a network, the network comprising network entities, which comprise:
    a set of computing entities (CPEs) for performing offloaded functions on data;
    a set of connecting entities (CNEs) for connecting users to the network and capable of performing a set of functions on the data; and
    a set of forwarding entities (SFEs) for forwarding the data between the CPEs and the CNEs,
the method comprising:
    determining:
        a) network information, the network information comprising: network topology information and network capability information of the network,
        b) entity location information, the entity location information comprising: network locations of the network entities, and
        c) function splitting information, the function splitting information comprising possible configurable functions which can be split,
    based on the determined network information, the determined entity location information, and the determined function splitting information, performing a joint optimization procedure to jointly determine:
        A) routing between the network entities,
        B) assignments of each of the CNEs to one or more of the CPEs, and
        C) function splits defining, for each of assignments of CNEs to the CPEs, which of the set of functions are performed by the corresponding one of the CNEs and which are performed by the corresponding one of the CPEs as the offloaded functions,
    assigning each of the CNEs to the one or more CPEs based on the determined assignments, and
    offloading at least part of the set of functions performable by one or more of the CNEs to a corresponding one of the CPEs, assigned to performing the offloaded part the set of functions, based on the determined function splits.

2. The method according to claim 1, wherein performing the joint optimization procedure comprises calculating an overall cost function comprising a plurality of cost functions representing effects of different changeable parameters of the network.

3. The method according to claim 2, wherein the cost functions represent traffic of the CNEs and computing resources required for processing the functions on the CNE and the CPE.

4. The method according to claim 2, wherein the joint optimization procedure comprises determining a solution for each of A-C that jointly results in minimizing the overall cost function.

5. The method according to claim 2, wherein at least one of the cost functions is a linear function.

6. The method according to claim 1, wherein one or more constraints are used during the optimization procedure, and wherein the one or more constraints represent at least one of a link delay between different entities, and a link capacity between the different entities.

7. The method according to claim 6, wherein the link delay is used additively between different links.

8. The method according to claim 6, wherein the link capacity is represented by a binary function indicating that a link capacity threshold is exceeded or not exceeded.

9. The method according to claim 1, wherein performing the optimization procedure comprises executing a branch-and-bound based algorithm or a greedy algorithm to jointly determine the routing between the network entities and the assignments of each of the CNEs to the one or more CPEs.

10. The method according to claim 1, wherein the optimization procedure is performed on a centralized computing entity.

11. The method according to claim 1, wherein the network comprises a radio access network, and wherein the CNEs comprise base stations for user equipment.

12. The method according to claim 1, wherein the functions are in at least part provided as virtualized network functions.

13. The method according to claim 1,
    wherein the network comprises a radio access network,
    wherein each of the CNEs are provided as a base station comprising at least one of a base band or a remote radio unit, the remote radio unit configured to provide radio access to user equipment,
    wherein each of the CPEs are provided as a processing unit or a centralized computing pool,
    wherein each of the forwarding entities are provided as a switch configured to provide packet-based switching, and
    wherein the functions are in at least part provided as virtualized network functions.

14. The method according to claim 1, wherein the performing the optimization procedures comprises determining a joint solution for the routing, the assignments, and the functions splits that results in minimizing a cost function, the cost function comprising as inputs: a model of cost incurred by traffic of each of the CNEs; a model of cost associated with computing resources required for processing, by each of the CPEs, the offloaded function for each of the function splits; and a model of cost associated with computing resources required for processing, by each of the CNEs, the functions not offloaded for each of the function splits.

15. A network computing entity for optimizing a configuration of a network, the network comprising network entities, which comprise:
    a set of computing entities (CPEs) for performing offloaded functions on data,
    a set of connecting entities (CNEs) for connecting users to the network and capable of performing a set of functions on the data, and a set of forwarding entities (SFEs) for forwarding the data between the CPEs and the CNEs, the network computing entity being configured to:
determine:
  a) network information, the network information comprising: network topology information and network capability information of the network,
  b) entity location information, the entity location information comprising: network locations of the network entities, and
  c) function splitting information, the function splitting information comprising possible configurable functions which can be split,
based on the determined network information, the determined entity location information, and the determined function splitting information, performing a joint optimization procedure to jointly determine:
  A) routing between the network entities,
  B) assignments of each of the CNEs to one or more of the CPEs, and
  C) function splits defining, for each of assignments of CNEs to the CPEs, which of the set of functions are performed by the corresponding one of the CNEs and which are performed by the corresponding one of the CPEs as the offloaded functions,
assigning each of the CNEs to the one or more CPEs based on the determined assignments, and
offloading at least part of the set of functions performable by one or more of the CNEs to a corresponding one of the CPEs, assigned to performing the offloaded part the set of functions, based on the determined function splits.

16. The computing entity of claim 15, wherein the network computing entity is a centralized entity in the network.

17. A non-transitory computer readable medium storing a program configured to cause a computer to execute a method optimizing a configuration of a network, the network comprising:
a core network providing core network functions; and
an access network connected to the core network, the access network comprising network entities, which comprise:
  a set of computing entities (CPE) for performing offloaded functions on data and being connected to the core network,
  a set of connecting entities (CNE) for connecting users to the network and capable of performing a set of functions on the data, and
  a set of forwarding entities (SFEs) for forwarding the data between the CPEs and the CNEs,
the method comprising:
determining:
  a) network information, the network information comprising: network topology information and network capability information of the network,
  b) entity location information, the entity location information comprising network locations of the network entities, and
  c) function splitting information, the function splitting information comprising possible configurable functions which can be split, and
based on the determined network information, the determined entity location information, and the determined function splitting information, performing a joint optimization procedure to jointly determine:
  A) routing between the network entities,
  B) assignments of each of the CNEs to one or more of the CPEs, and
  C) function splits defining, for each of assignments of CNEs to the CPEs, which of the set of functions are performed by the corresponding one of the CNEs and which are performed by the corresponding one of the CPEs as the offloaded functions,
assigning each of the CNEs to the one or more CPEs based on the determined assignments, and
offloading at least part of the set of functions performable by one or more of the CNEs to a corresponding one of the CPEs, assigned to performing the offloaded part the set of functions, based on the determined function splits.

* * * * *